(12) United States Patent  
Nuttall et al.

(10) Patent No.: US 7,929,375 B2  
(45) Date of Patent: Apr. 19, 2011

(54) METHOD AND APPARATUS FOR IMPROVED ACTIVE SONAR USING SINGULAR VALUE DECOMPOSITION FILTERING

(75) Inventors: Albert H. Nuttall, Old Lyme, CT (US); Richard A. Katz, East Lyme, CT (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 189 days.

(21) Appl. No.: 11/768,361

(22) Filed: Jun. 26, 2007

(65) Prior Publication Data

US 2009/0003134 A1 Jan. 1, 2009

(51) Int. Cl.  
*G01S 15/00* (2006.01)

(52) U.S. Cl. ........................................ 367/100

(58) Field of Classification Search ............. 367/100, 367/87  
See application file for complete search history.

(56) References Cited

U.S. PATENT DOCUMENTS

| | | | |
|---|---|---|---|
| 4,195,359 A * | 3/1980 | Miller et al. | 367/112 |
| 4,969,131 A * | 11/1990 | Harris, Jr. | 367/99 |
| 4,972,385 A * | 11/1990 | Teel | 367/99 |
| 5,047,993 A * | 9/1991 | Halley | 367/105 |
| 5,165,051 A * | 11/1992 | Kumar | 342/100 |
| 5,444,669 A * | 8/1995 | Polvani | 367/96 |
| 5,612,928 A * | 3/1997 | Haley et al. | 367/131 |
| 5,886,661 A * | 3/1999 | Harrison et al. | 342/22 |
| 6,096,085 A * | 8/2000 | Sammelman | 703/2 |
| 6,714,481 B1 * | 3/2004 | Katz et al. | 367/100 |
| 2009/0003134 A1 * | 1/2009 | Nuttall et al. | 367/87 |

* cited by examiner

*Primary Examiner* — Dan Pihulic  
(74) *Attorney, Agent, or Firm* — James M. Kasischke; Michael P. Stanley; Jean-Paul A. Nasser

(57) ABSTRACT

The invention is a method for improved active sonar using a singular value decomposition filtering and a Volterra-Hermite Basis Expansion to model real active sonar measurements. The fitting model minimizes the sum of the squared errors between a measured channel response, z(t), and model response, y(t), which is a fitted Volterra Series solution. The model requires as input an excitation waveform, x(t), to which is fitted the model response, y(t). A contracted broadband cross-ambiguity function is used to correct the excitation waveform for Doppler and range effects. Once completed, the modeled response can be used to determine the linearity or non-linearity of the channel effects. Appropriate measures can be utilized to reduce these effects on the measured channel response.

20 Claims, 5 Drawing Sheets

METHOD AND APPARATUS FOR IMPROVED ACTIVE SONAR USING SINGULAR VALUE DECOMPOSITION FILTERING

STATEMENT OF GOVERNMENT INTEREST

The invention described herein may be manufactured and used by or for the Government of the United States of America for Governmental purposes without the payment of any royalties thereon or therefore.

BACKGROUND OF THE INVENTION

1. Field of the Invention

The present invention relates generally to systems and methods for active sonar systems and, more particularly, to a sonar system which utilizes Eigen Filters and a Volterra-Hermite model for improved sonar signal detection and classification.

2. Description of the Prior Art

Active sonar signal propagation and reflection have intrinsic properties that are notably affected by the channel and/or target characteristics. Through measurement, one often knows the signal transmitted into the propagation channel and the waveform at the receiver input. The difficulty is to accurately model, measure, estimate, and characterize the channel response itself.

Signal distortion in an active sonar system may arise for many reasons such as, for example, irregular sea bottoms and surface interactions, nonlinear resonant scattering within the propagation channel, reverberation, nonhomogenous responses due to channel and/or target interactions, target scattering profiles, multipath reflections, additive noise generated by waves, transmission losses, changing distances from the target, and the like.

Active sonar as used herein refers to sonar systems that utilize radiating acoustic sources to probe an area to be searched so as to illuminate a target object. One example of this type of sonar system is a conventional sonar device wherein a highly directional beam of sonic energy periodically radiates from a scanning transducer, which in turn also operates as a receiver to detect echoes reflected from any object(s) within the propagation channel. Modern active sonar systems commonly provide multibeam capabilities as well. Sonar devices tend to have relatively high transmission losses, which increase as a function of the frequency of the propagated energy.

A large number of active sonar data processing techniques rely on linearity in an acoustic signature for extracting and identifying information about a particular target illuminated by the active transmission. However, if linear techniques are applied to a target-of-interest in which the target and/or channel response is actually nonlinear, the subsequent purely linear processing of these data leads to results that can be incorrect and misleading.

Various inventors have attempted to solve the above and related problems as evidenced by the following patents.

U.S. Pat. No. 4,195,359, issued Mar. 25, 1980, to Miller et al., discloses an automatic echo detection and classification system wherein sonar equipment transmits pulses toward a target in predetermined and equal time intervals and receives background, dopplered and undopplered echoes which are produced as video output and audio output, the improvement which comprises means for establishing a non-directional background reference signal voltage from the video output, means for separating the audio output into dopplered signal voltage outside the reverberation band and undopplered signal voltage within the reverberation band, means for algebraically adding the background reference signal voltage to both the dopplered and undopplered signal voltages, a first amplifier for the resultant dopplered signal voltage, a target indicator alarm, a first energizing circuit therefore operative by the amplified dopplered signal voltage to indicate that a target has been located, means for obtaining from the resultant undopplered signal voltage a selected signal voltage above a predetermined level, a first gate normally in closed position, a first multivibrator therefore and operable by the selected undopplered signal voltage to move to open position for a predetermined interval to pass a first echo of a predetermined duration, a second gate normally in open position for passing the first echo after it has passed the first gate, a second multivibrator for the second gate operative to close the second gate for a predetermined period, an amplifier for the undopplered signal voltage of the first echo after it has passed through both the first and second gates, a second energizing circuit for the target alarm, said second circuit including the second multivibrator, and being operative to energize the second multivibrator by the amplified undopplered signal voltage of the first echo after it has passed through the second gate and after the predetermined period for which the second gate is closed and a second echo appears, which is substantially within the same range as the first echo, the second gate will be open for passing of the second echo to operate the target indicator alarm.

U.S. Pat. No. 4,654,835, issued Mar. 31, 1987, to Paul L. Feintuch, discloses a bistatic sonar employing Least Mean Square (LMS) adaptive spatial prediction which is used to process against surface reverberation from the convergence zone (CZ). Hydrophones spatially separated from the primary array are used as references. The critical behavior exploited by the invention is that since the reverberation may be viewed as an extended source, the correlation drops off with separation between the reference and primary sensors, while it stays constant for the plane wave target return. The reverberation is non-stationary, functionally dependent on the signal (even though the backscatter is statistically uncorrelated with the signal), and spatially extended over the sector of the CZ annulus cut out by the transmitter azimuth beamwidth. The detection of the target is based on the sudden appearance of one strong target point source within a densely packed region of weak point sources that have been constantly present and whose sum is much larger than the target. The use of more than a single reference leads to a minimal improvement in detection performance and may actually degrade performance due to increased algorithm noise. Detection performance tends to increase with increasing separation distance between the primary and the reference hydrophone. For signal, reverberation, and algorithm parameters consistent with modern active sonar systems operating in the CZ mode, the spatial prediction approach to detection of the plane wave signal will allow detection of targets not possible using conventional active processing, provided the reference hydrophone can be placed to yield a normalized correlation of less than 0.05. Such values may be obtained with very reasonable spacing between primary and reference hydrophones, allowing the reference to be positioned, for example, along the hull aft of the primary array.

U.S. Pat. No. 4,686,532, issued Aug. 11, 1987, to Alastair D. McAulay, discloses a sonar or radar that permits primary distributed scatterers that are close to the sonar or radar, relative to the array dimension, to be rapidly and accurately located and pertinent characteristics to be estimated, such as Doppler and complex scattering strength. The region viewed is partitioned in annuli instead of angular pie-shaped slices as is normally the case for conventional sonar. This avoids the difficulty with conventional sonar or radar of distinguishing whether a scatterer is in a side lobe or in the main beam in the important case of approaching multiple scatterers, e.g., robotic vehicle sensors or a torpedo terminal-homing on a target, because near regions may be examined in all directions prior to regions further out. Computational speed is achieved by utilizing pre-computation and leaving only part of the computation to be performed in real time.

U.S. Pat. No. 4,969,131, issued Nov. 6, 1990, to William G. Harris, Jr., discloses an echo ranging system of the invention which comprises circuit means to differentiate between shadows cast by objects and the period of time prior to the receipt of the first bottom return, as well as the lack of bottom reverberation for other reasons. Additional circuit means determine if the length of the shadow signals in comparison to their range exceeds a predetermined value. Circuit means are also included to produce a first electrical signal when such shadow signals are received. Further circuitry analyzes the shadow signals for which the first electrical signals were provided and produces a second electrical signal when said object shadow signals exceed in number or length a predetermined value. Additional circuit means are provided to convert said first and second electrical signals to suitable audible signals which may be readily distinguished, one from the other.

U.S. Pat. No. 4,972,385, issued Nov. 20, 1990, to Willis A. Teel, discloses a sonar system having signal analyzing circuitry rendering the system responsive to objects of a predetermined size. The signal analysis is accomplished by a spectral analysis of the echo signals returned from the objects. In particular, the relative height of adjacent side lobes of echo signals energy returned to the sonar are compared to indicate the size of the object reflecting the signal.

U.S. Pat. No. 5,047,993, issued Sep. 10, 1991, to Robert Halley, discloses an array of sonar transmitting and receiving transducers that are so physically arranged and their signal voltage so combined as to form beams pointing to various points of the compass. A signal is formed on a different conductor for each beam and the conductors are swiped in rapid succession to determine the presence of any beam signal. Since any signal may be short-lived, the total sampling process must be in milliseconds. Any signal that occurs is converted to digital form and is fed into a first recirculating delay line time compression storage loop. All signals are stored in the first loop. Then the cluster of signals pertaining to one beam is read out to a second recirculating delay line time compression storage loop from which it is read out to a variable frequency super-heterodyne and displayed on a cathode ray tube.

U.S. Pat. No. 5,165,051, issued Nov. 17, 1992, to Rajendra Kumar, discloses a method and associated apparatus for accurately and quickly estimating the amplitude, frequency and phase of a signal of interest. The method comprises the steps of inputting the signal of interest; generating a reference signal with adjustable amplitude, frequency and phase at an output thereof; mixing the signal of interest with the reference signal and a signal 90 degrees out of phase with the reference signal to provide a pair of quadrature sample signals comprising respectively a difference between the signal of interest and the reference signal and a difference between the signal of interest and the signal 90 degrees out of phase with the reference signal; using the pair of quadrature sample signals to compute estimates of the amplitude, frequency, and phase of an error signal comprising the difference between the signal of interest and the reference signal employing a least squares estimation; adjusting the amplitude, frequency, and phase of the reference signal from the numerically controlled oscillator in a manner which drives the error signal towards zero; and, outputting the estimates of the amplitude, frequency, and phase of the error signal in combination with the reference signal to produce a best estimate of the amplitude, frequency, and phase of the signal of interest. The preferred method includes the step of providing the error signal as a real time confidence measure as to the accuracy of the estimates wherein the closer the error signal is to zero, the higher the probability that the estimates are accurate. A matrix in the estimation algorithm provides an estimate of the variance of the estimation error.

U.S. Pat. No. 5,444,669, issued Aug. 22, 1995, to Donald G. Polvani, discloses a torpedo relative position measuring system, including an active sonar system and a passive magnetic system, which is coupled to computing apparatus which operates in response to a set of stored computer programs, all located in the torpedo for homing in on a ferrous target. At long ranges and mid ranges, the torpedo is directed to the target by the sonar system, while at near ranges, the magnetic system determines the x, y, z relative position coordinates between the target and the torpedo in accordance with a calibrated stored magnetic model of the target and numerical solution of the non-linear equations linking the target's magnetic field, as measured at the torpedo, with the target's relative position. Guidance information derived therefrom is then fed to the torpedo's guidance system. With the magnetic system providing the relative position of the target at close range, the torpedo's normal guidance system can readily steer the torpedo to a desired hit point on the target.

U.S. Pat. No. 5,612,928, issued Mar. 18, 1997, to Haley et al., discloses a method and apparatus for classifying objects in images utilizing means for selecting portions of those images which contain objects and means for classifying those objects based upon parameters of the selected portions, which parameters are useful for classifying the objects. The selecting means preferably is a shadow and highlight detector, a statistical window detector and a neural network window detector whose output is combined in a cue. The parameters are determined from the grey levels and positions of pixels using one or more modules which perform certain mathematical operations on this data. Such parameters include edge parameters, smoothness, clutter, presence and characteristics of highlights and shadows, and texture. The invention is particularly useful for classifying objects in sonar images as natural or man-made.

U.S. Pat. No. 5,886,661, issued Mar. 23, 1999, to Harrison et al., discloses a detection and classification system for underwater objects which uses a transmitting unit and a receiving unit. The transmitting unit comprises a waveform generator, a power amplifier, and a transmitting antenna. The receiving unit comprises a receiving antenna, a pre-amplifier, a first harmonic suppressor, a digitizer, and a computer. The transmitting unit radiates an analog electromagnetic wave signal into a conductive medium such as seawater which the receiving unit detects and analyzes by a differential spectral analysis after conversion of the signal into binary code. The system uses a signal-processing method which includes the steps of determining the size of the underwater object to be detected, transmitting an electromagnetic wave with a wavelength proportioned to the size of the object, performing a spectral analysis of the received signal, performing another spectral analysis at a different time or different location, comparing the two spectra performed, and analyzing the difference between the two spectra.

U.S. Pat. No. 6,096,085, issued Aug. 1, 2000, to Gary Steven Sammelman, discloses a computer-readable software stored on a storage medium and executed on a computer to perform an integrated sonar simulation, including a parameter definition code for defining a plurality of parameters of a sonar, target and sonar environment, and a Signal to Noise Ratio (SNR) computation code for computing a SNR of the sonar as a function of range to target, based upon the parameters defined by the parameter definition code. The parameters defined by the parameter definition code include ambient noise, volume scattering strength of the sonar environment, sound velocity profile of the sonar, beam patterns of both projector and receiver of the sonar, type of sonar, range resolution of the sonar, number of eigenrays striking the surface and bottom of the sonar environment, number of eigenrays striking the target, ray trajectories to the target, and surface and bottom scattering strength as a function of angle. The software also includes a target strength model generating code for computing scattering from a selected complex target of a stored set of complex target selections, to thereby generate a target strength model for the selected complex target.

U.S. Pat. No. 6,714,481, issued Mar. 30, 2004, to Richard A. Katz and Albert H. Nuttall discloses a sonar system and method to extract and identify information about a particular target illuminated by an active sonar system. The invention utilizes a Volterra Series Expansion in conjunction with a least squares procedure to estimate the combined channel and target responses, which may be linear or nonlinear. The system estimates the channel and target responses for different orders of the Volterra Series Expansion and then selects the order for which a minimum error is determined with respect to a measured acoustic return signal. The system requires as inputs only the excitation signal and the corresponding measured acoustic return waveform.

However, the above references do not fully achieve signal resolution to solve the problem of sonar signal distortions and Doppler effects. Consequently, there remains a long felt but unsolved need for a system capable of detecting and identifying target(s) of interest when nonlinearity is present in the acoustic signature, and to appropriately refine a simulated acoustic signature to account for Doppler correction using a broadband cross-ambiguity function. Those skilled in the art will appreciate the present invention that addresses the above and other problems.

SUMMARY OF THE INVENTION

Current signal processing methods are inefficient because they suffer from energy spreading losses due to multiple propagation paths, target extension, moving boundaries, moving source and receiver (i.e. Doppler effects), and variations in the speed of sound. The invented method utilizes wide band, long duration pulses (i.e., large time-bandwidth product) to achieve high resolution waveform ranging and Doppler accuracy by recombination of energy spreading losses, using linear and higher-order kernel estimates based on a Volterra-Hermite polynomial expansion. The Volterra-Hermite basis expansion uses combinations of independent filter outputs derived from an eigenvalue decomposition of the covariance matrix of the excitation input, a Gaussian-distributed random white process.

In accordance with the present invention, the method employs a fitting model to real active sonar measurements, where the fitting model minimizes the sum of the squared errors between the actual measurement and the model output. The model requires as input an excitation signal, x(t), where t is the time variable, and the corresponding measured channel response, z(t), with which to fit the model response, y(t). The quality of fit is determined using a Minimum Least Squares (MLS) solution of the model output compared with the measured response. The MLS solution for a general excitation is performed by fitting a modeled Volterra Series expansion y(t) to actual data measurements z(t) and minimizing the sum of squared errors between the two. In the fitting model, kernels $\{h_K(\tau_1, \ldots, \tau_K)\}$ from a Volterra series expansion $y(t)=f\{h_K(\tau) x(t)\}$ are chosen to minimize the total squared error, E, where $\{\tau_K\}$ are dummy time variables. The selected model expansion for y(t) contains kernels up to a particular order K with a selected memory length in units of the time sampling increment. In this disclosure, sampled discrete signals are frequently identified as functions of n rather than functions of continuous time t because in discrete time, $n \cdot \Delta t = t$.

In the invention, the excitation signal x(n) (limited in the frequency domain to the band $[f_a, f_b]$) is broken up into a collection of independent filtered versions of x(n) using a Singular Value Decomposition (SVD) of the covariance matrix of the excitation signal. Each of the eigenvectors of the decomposition represents a filtering operation on the excitation signal. Each filter output response is statistically independent of any other filter output response at that same time instant, $t = n \cdot \Delta t$. This approach was found to be far superior to previous procedures wherein a contiguous bank of disjoint narrowband filters that encompassed the entire bandpass excitation, x(n), is constructed. In the previous approaches, the narrowband filters are adjacent, yet designed to have minimal overlap, such that the filters can be considered "more or less" independent of one another, given that their input, x(n), is bandpass white Gaussian with zero mean. However, the SVD method of the current invention provides better performance results (i.e. assured independence) than the conventional adjacent narrowband filter bank method. The filter outputs having assured independence are therefore suitably modeled using a Hermite basis expansion of the Volterra procedure, and the method incorporates a Hermite basis expansion of all cross-product terms of the series expansion in the spirit of the Wiener G-functional modification. Wiener's modification guarantees linear independence of the individual kernel components outputs. The linear independence of the individual kernel components enables one to assess individually the energy contributions arising from the linear as well as the higher-order nonlinear components of the received waveform.

The modeled waveform y(t) provided by the invented method and apparatus can be used to simulate a variety of active sonar detection, classification and localization signals.

BRIEF DESCRIPTION OF THE DRAWINGS

The foregoing and other objects will become readily apparent by referring to the following detailed description and the appended drawings in which.

DESCRIPTION OF THE INVENTION

Figure 1:
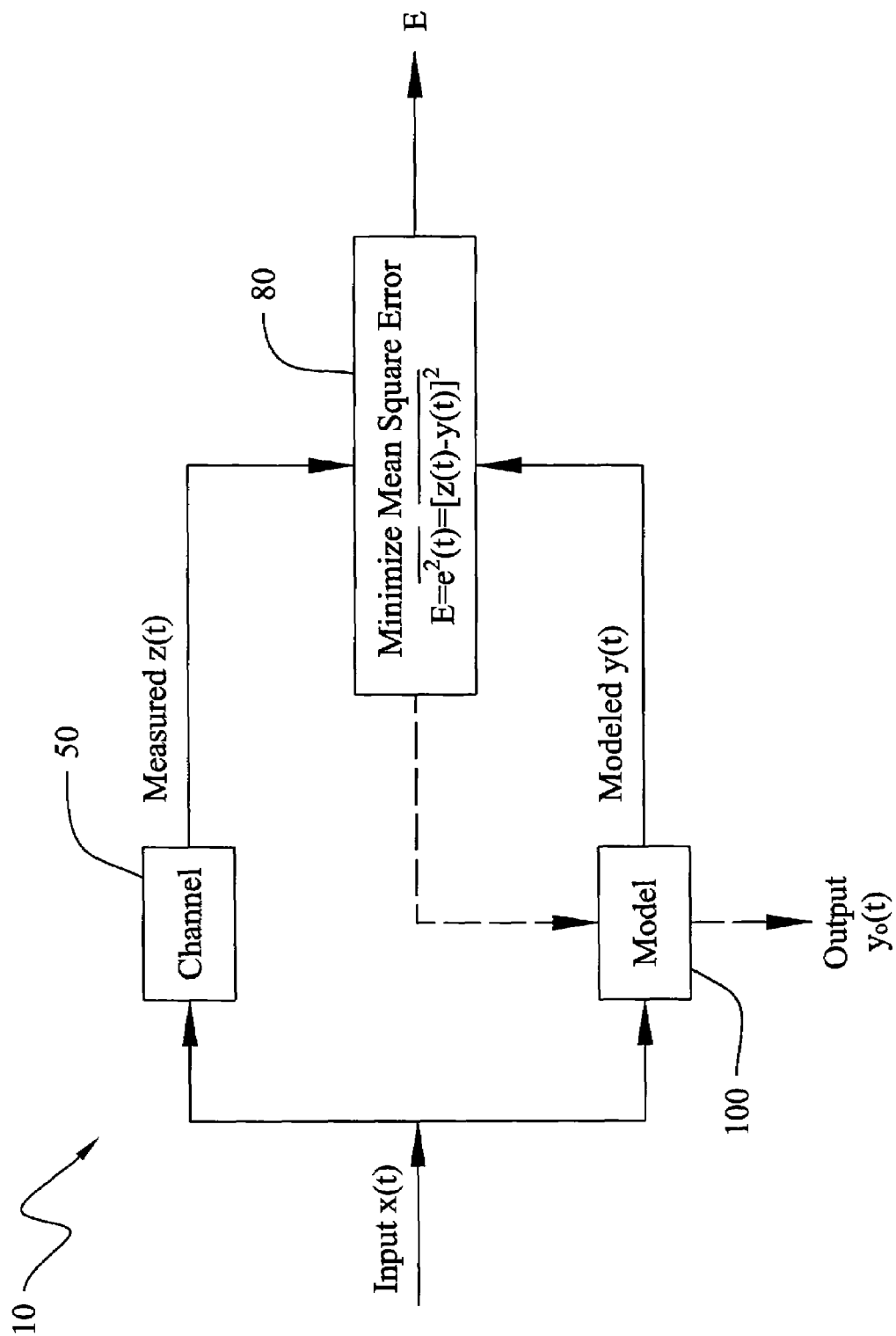
FIG. 1 is a Fitting Model Block Diagram.

The invention 10 is a method and apparatus that employs a fitting model to real active sonar measurements, where the fitting model minimizes the sum of the squared errors between actual measurement and the model output. As illustrated in FIG. 1, the model 100 requires an input excitation waveform, x(t), where t is the time variable, and a measured channel response 50, z(t), against which to fit the model response, y(t). The quality of fit is determined using a MLS solution of the Sonar Signal Propagation model output 100 against the measured response. In equation 1, E, as shown in box 80, is the mean square error, e(t) is the instantaneous error defined as e(t)=z(t)−y(t), where y(t) is the model response 100, and z(t) is the measured channel response 50.

$$E = \overline{e^2(t)} = \overline{[z(t)-y(t)]^2} \quad (1)$$

Figure 2:
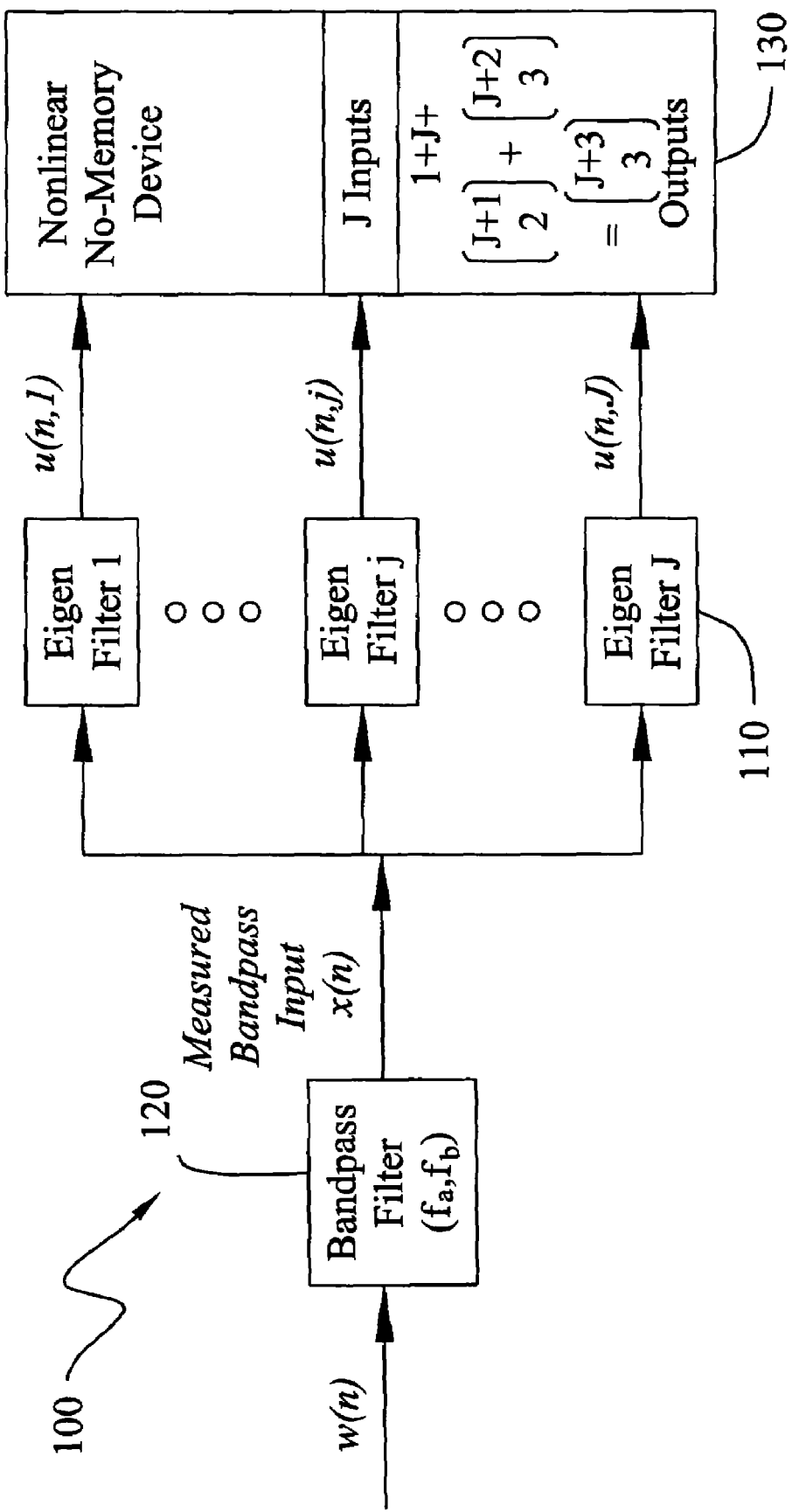
FIG. 2 is a Sonar Signal Propagation Model of the Eigen Filters.

The MLS solution for a general excitation is performed by fitting a modeled Volterra Series solution y(t) to actual data measurements z(t) and minimizing the sum of squared errors between the two. In the fitting model, kernels $\{h_K(\tau_1, \ldots, \tau_K)\}$ from a Volterra series expansion $y(t)=f\{h_K(\tau), x(t)\}$ are chosen to minimize E. Referring to FIG. 2, a first processing step of the Sonar Signal Propagation model 100, is to break up the excitation signal x(n) (limited in the frequency domain to the band $[f_a, f_b]$) into a collection of independent filtered versions of x(n), where x(n) is bandlimited white Gaussian noise. The break up step is achieved by performing a Singular Value Decomposition (SVD) of the covariance matrix of the excitation signal x(n) using Eigen filters 110. Each of the eigenvectors of the decomposition represents a filtering operation on the excitation signal. In the particular case of the SVD, all the eigenvalues are real, and the eigenvectors of a real, symmetric covariance matrix corresponding to different eigenvalues are orthogonal. Therefore, the eigenvalue decomposition (EVD) and the SVD become equivalent in this case.

In the signal propagation model, up to 100 eigenvectors are computed, but only those filters are retained that have eigenvalues that contain the majority of the filtered in-band energy. As an example, consider a bandpass white Gaussian excitation from 5 kHz to 10 kHz. It can be shown that the majority (e.g., greater than 99%) of the filtered energy falls within the first 50 filters associated with the largest eigenvalues. Therefore, the first 50 filters are retained, and the latter 50 are discarded; the model is then exercised using just these 50 retained filters. In a second transformation, the 50 filter outputs are then used in various combinations to construct a nonlinear basis set with which to determine the kernel estimates of a Wiener series expansion. The basis set can be described as a nonlinear no-memory device 130. The order of the highest nonlinearity selected determines the number and combinations of filters that are required to construct the essential "kernels" for performing an accurate estimate of the measured channel response. For example, for J=50 filters retained, there are 50 first-order (linear) combinations, J(J+1)/2=1,275 second-order (quadratic) combinations, and J(J+1)(J+2)/6=22,100 third-order (cubic) combinations to consider. In this second transformation, it is mandatory to maintain a lack of correlation between all the kernel component outputs of any specified order at the same time instant, since one wants to know the individual energy contributions at each order of the received waveform. For example, the kernel order containing the largest energy contribution provides an indication of whether or not the dominant attribute in the received waveform was either linear or nonlinear. If most of the energy were associated with the first-order kernel, then the received waveform energy was dominated by linearity. If most of the energy was found to reside in the higher-order kernels, then the energy in the received waveform had evolved principally by nonlinear interactions within the propagating medium and/or target.

To ensure orthogonality among the kernel outputs in the series expansion, a Hermite basis expansion of all cross-product terms of the series is adopted in the spirit of Wiener's G-functional modification. Utilizing Wiener's expansion guarantees linear independence of the individual kernel components at the same time instant. As previously stated, this enables one to assess individually the energy contributions arising from the linear versus the higher-order components of the received waveform.

The Wiener expansion of a Gaussian broadband stationary signal that has been subject to a nonlinear transformation with memory, yielding measured data z(t), first takes the form of a parallel bank of eigenfunction (linear) filters followed by a second nonlinear memoryless transformation T with multiple inputs and outputs. (This T is the block identified as 130 in FIG. 2 and FIG. 3.) In particular, suppose there are J linear filters in the parallel bank 110, yielding output waveforms $\{u(n, j)\}$, $j=1:J$, where n is the time sample index. These output processes are uncorrelated Gaussian at time sample n and can be normalized to unit variance. The second nonlinear memoryless transformation 130 emits outputs consisting of first-order (linear) terms, second-order (quadratic) terms, and third-order (cubic) terms.

The linear terms at the output of the summer 150 take the form $$y_1(n) = \sum_{j=1}^{J} C_1(j) u(n, j), \quad (2)$$

where coefficients $\{C_1(j)\}$ at the input to the summer are optimally chosen to make waveform samples $y_1(n)$ look as much like the linear component of measured data z(n) as possible, in a least-squares sense.

The second-order terms at the summer 150 output take two different forms, namely, $$y_{2a}(n) = \sum_{j=1}^{J} C_2(j, j)[u^2(n, j) - 1], \quad (3)$$

$$y_{2b}(n) = \sum_{j>k} C_2(j, k) u(n, j) u(n, k),$$

where the coefficients $\{C_2(j, k)\}$ are to be chosen for an optimal representation of the second-order effects in measured waveform z(n). Due to the Gaussian unit-variance character of orthogonal waveforms $\{u(n,j)\}, j=1:J$, each of the components in equations (2) and (3) are uncorrelated with each other at zero relative time delay. This feature is used to advantage in fitting equation (3) to the second-order terms in measured data z(t), by way of generating a data matrix with very low condition number in the least squares fitting procedure.

The third-order terms take three different forms, namely, $$y_{3a}(n) = \sum_{j=1}^{J} C_3(j, j, j)[u^3(n, j) - 3u(n, j)], \quad (4)$$

$$y_{3b}(n) = \sum_{j>k} C_3(j, j, k)[u^2(n, j) - 1]u(n, k),$$

$$y_{3c}(n) = \sum_{j \geq k > l}^{J} C_3(j, k, l)u(n, j)u(n, k)u(n, l),$$

where coefficients $\{C_3(j, k, l)\}$ are to be chosen for an optimal representation of the third-order effects in measured waveform $z(n)$.

Again, all components in equations (2) through (4) are uncorrelated with each other at the same sample instant n.

In actual practice, since the strengths of the various nonlinear orders are unknown a priori in the measured data z(n), a simultaneous fit of the sum of all the terms in equations (2) through (4) must be conducted to the measured data z(n). This simultaneous third-order fit encounters a very large data matrix (65000 by 2300 for the inventors' data) that must be pseudo-inverted in order to find the totality of best coefficients. It is therefore mandatory that the condition number of this large data matrix be kept manageable, that is, as close to 1 as possible.

Figure 3:
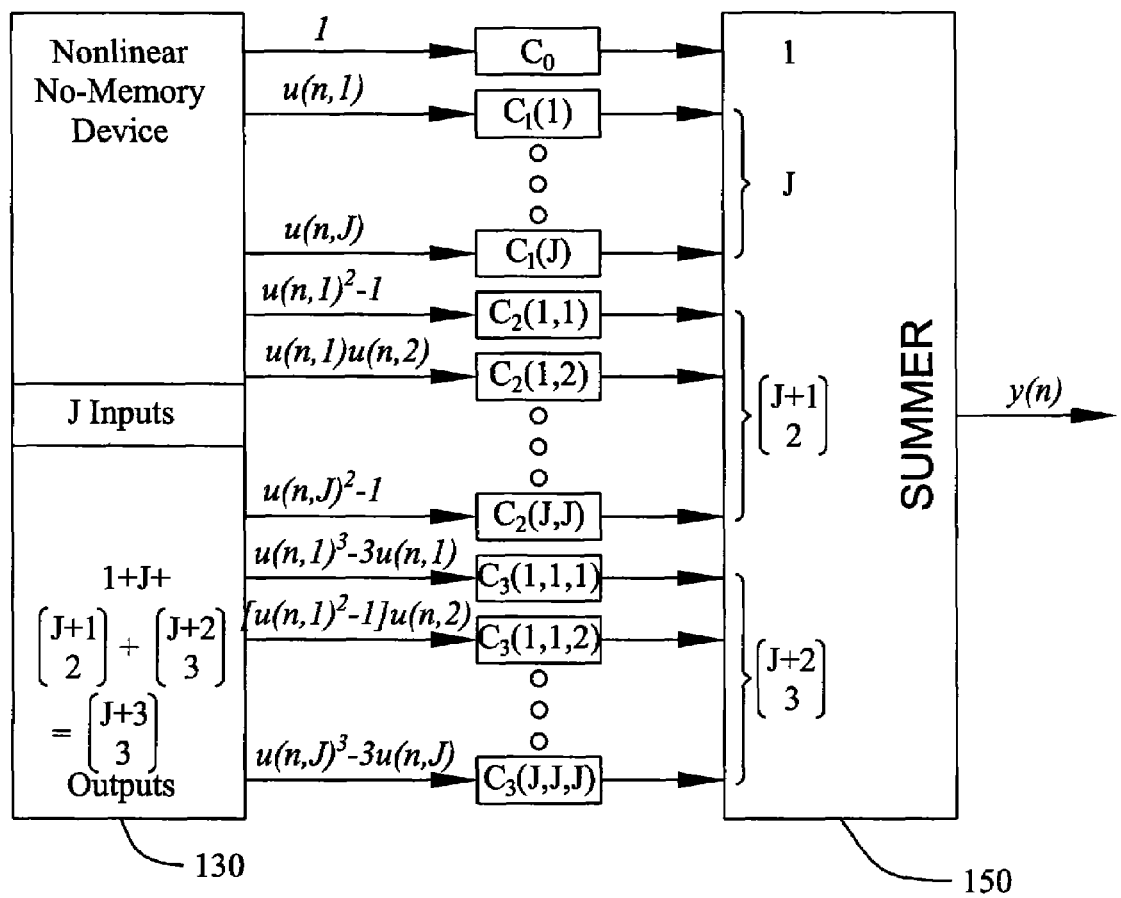
FIG. 3 is a Sonar Signal Propagation Model of the Hermite basis expansion of all cross-product terms of the Volterra series, wherein to insure orthogonality among the kernels, a Wiener modification is employed.

As illustrated in FIG. 3, the number of coefficients at the input to summer box 150 to be adjusted is a function of the number of filters J. For J=50 filters, there are 50 first-order combinations, J(J+1)/2=1275 second-order combinations, and J(J+1)(J+2)/6=22100 third-order combinations to consider. The sum is J+J(J+1)/2+J(J+1)(J+2)/6=23,425 combinations. Counting the direct current term $C_0$, this sum can be expressed generally as:

$$I = 1 + J + \binom{J+1}{2} + \binom{J+2}{3} = \binom{J+3}{3}, \quad (5)$$

where I is the total number of coefficients that must be adjusted. The sum of all the Volterra-Hermite series components is the complete model response y(t), alternatively shown as y(n). This response y(n) can then be used by an operator or sonar system for emulating or removing the sonar channel/target response.

Another important aspect of the model fit considers the expansion or contraction of the time sequence of the propagating signal due to motions of the acoustic source or target. This effect is described by the radial velocity, or Doppler, in the line-of-sight direction between the acoustic source and target location. For a frequency modulated signal (e.g., linear frequency modulated (LFM) waveform), small values of the target velocity (e.g., <1.5 feet/sec) may be insignificant, since signals of this type have a tilted elliptical ambiguity function which is relatively insensitive to Doppler. However, for a high-resolution signal, such as the one described above (e.g., white bandlimited Gaussian excitation of 5 kHz bandwidth), this is not the case. Because of the inherent high resolution and unambiguous peak of the large time-bandwidth waveform (i.e., many degrees of freedom), ever so small changes in range are critical, as are very small changes in Doppler. Therefore, the method further comprises the use of an initial ancillary procedure in order to compute the broadband cross-ambiguity function of the excitation and response waveforms to be used in the Volterra fit, so as to account for the small, yet significant, changes due to Doppler. The broadband cross-ambiguity function effectively shows the cross-correlation between input excitation and response waveform over a wide range of Doppler and time delay values. The peak value of the broadband cross-ambiguity function provides an indication of the actual Doppler at the corresponding peak time delay.

The cross-ambiguity function is a function of both time delay and contraction factor. For a narrowband real signal s(t) centered at frequency $f_o$, the complex envelope representation is given by equation (6).

$$s(t) = \text{real}\{c(t)\exp(i2\pi f_o t)\}, \quad (6)$$

where c(t) is the low-frequency complex envelope corresponding to s(t). The standard (usual) complex ambiguity function of this waveform is defined as shown in equation (7).

$$\chi(\tau,\nu) = \int dt\, c(t)c^*(t-\tau)\exp(-i2\pi\nu t), \quad (7)$$

where $\tau$ is a time delay variable and $\nu$ is a frequency shift variable. This definition suffices for range and Doppler ambiguities if the time-bandwidth product of complex envelope c(t) is not considerably larger than unity. In effect, Doppler is treated as a frequency shift in equation (7), rather than its actual behavior, which is either a contraction or an expansion of the waveform on the time axis.

For very large time-bandwidth products of complex envelope c(t), the true effects of Doppler contraction (expansion) must be addressed more precisely and accurately than by equation (7). The proper definition is now shown in equation (8).

$$\eta(\tau,\nu) = \int dt\, c(t)c^*(\nu t - \tau), \quad (8)$$

where $\nu$ is called the contraction factor and is typically fairly close to 1 in value. The variable $\tau$ is again a time delay variable.

Whereas the evaluation of $\chi$ in equation (7) can be accomplished very efficiently by means of FFTs, due to the exponential dependence on $\nu$, the evaluation of $\eta$ in equation (8) is considerably more computationally extensive. For each contraction factor $\nu$ of interest, a cross-correlation of the complex envelope with a contracted and delayed version must be undertaken versus $\tau$, according to equation (8). Typically, in practice, waveform c(t) has been sampled at a fixed rate. When $\nu$ is not 1 in equation (8), the time-aligned samples of the latter function $c(\nu t - \tau)$ must be found by interpolating on the available sampled data, so that the multiplication in equation (8) can be realized synchronously in time. These additional calculations require considerably longer execution time and storage on a computer, but must be accomplished prior to the Volterra fitting procedure.

Once the appropriate Doppler correction for a paired excitation and channel output response has been obtained, the Doppler correction is input into the Volterra model (FIGS. 2 and 3) by adjusting the excitation input to the correct Doppler value. That is, the time-sampled sequence of the excitation waveform x(t) is contracted or expanded to exactly match the corresponding peak Doppler obtained from the broadband cross-ambiguity calculation.

Figure 4:
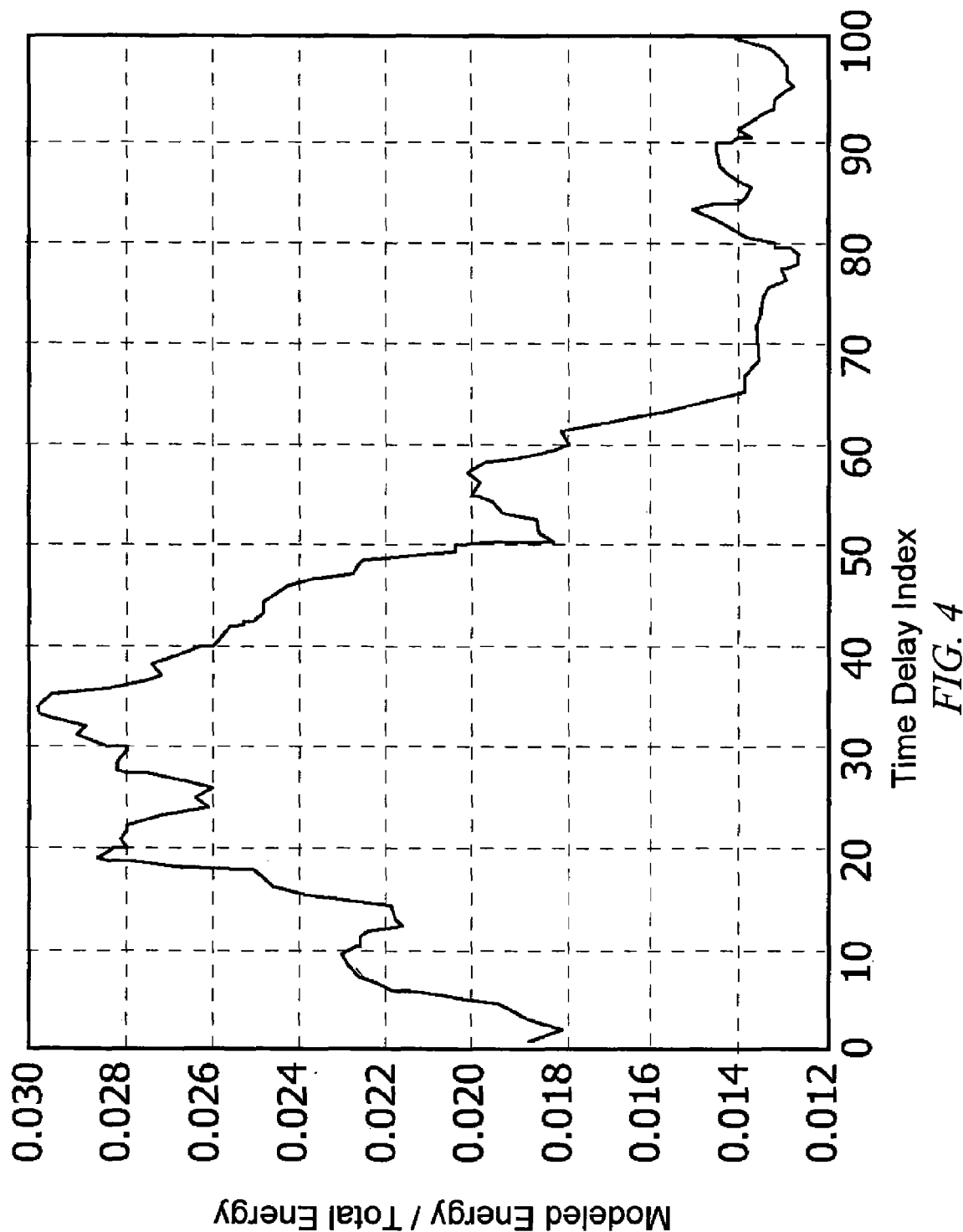
FIG. 4 is a graph of the ratio of modeled energy to total measured received energy as a function of time delay, employing a Zero-Doppler assumption.
Figure 5:
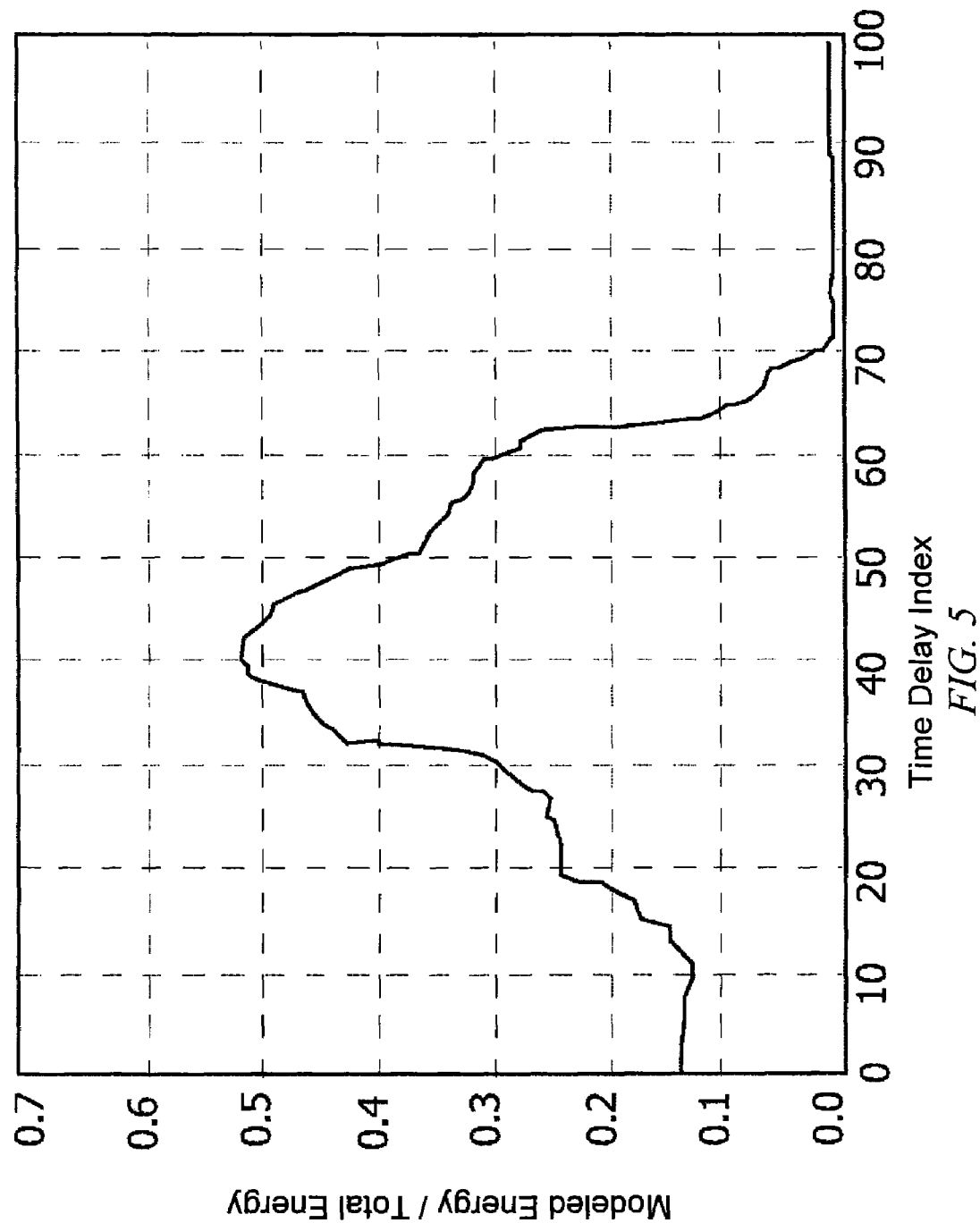
FIG. 5 is a graph of the ratio of modeled energy to total measured received energy as a function of time delay, employing a correction for the actual Doppler.

Assume for example a real measurement having a one-way active sound propagation path, in which the excitation input waveform is in the operational band of 5 kHz to 10 kHz and the receiver is at a distance of 10,000 yards in shallow water (e.g., the water depth is approximately 250 ft). Assume that the transmitter is stationary and that the receiver is opening in range (e.g., moving away) at a low Doppler of less than 1.5 knots. Hence, the required Doppler correction that would be applied is a velocity expansion factor of about −0.0003. For large time-bandwidth, high-resolution waveforms, contraction (expansion) factors of this magnitude are absolutely essential. FIGS. 4 and 5 respectively show the Volterra model fit using a linear kernel estimate of the actual measurement data based on a zero Doppler assumption (i.e., uncorrected for Doppler), and the corresponding fit based on the true Doppler correction. Note that without the correct Doppler expansion factor, the fit result in FIG. 4 is very poor, accounting for only 3% of the received energy. However, using the correct Doppler in FIG. 5, the fit is very good, accounting for 52% of the received energy. The Y axis in FIG. 4 of the ratio of modeled energy to total measured received energy varies from 0.012 to 0.030, while the range in FIG. 5 is 0.0 to 0.7. The peak correlation with the true Doppler correction is improved by a factor of 20. Over 50% of the total energy is explained by the model with the proper Doppler contraction correction, while only about 3% of the uncorrected modeled energy is accounted for in FIG. 4. The contracted cross-ambiguity function recombines the 'spread of energy' and is fully contained in the estimated kernel. Finally, the example also demonstrates the keen sensitivity of the model to the accuracy of parameter estimation. Through the modeling, it has been found that to achieve high resolution in ranging capability, one must also simultaneously achieve high accuracy in Doppler resolution as well (i.e., by a factor of the order of one part in a thousand). The contracted cross-ambiguity function enables this required measurement accuracy.

The invention provides a robust technique for obtaining an accurate channel estimate, with which to improve detection, classification, and localization (DCL) in real time environmentally adaptive operational situations. DCL performance gains over conventional matched filtering (i.e., of the transmit replica with the received waveform correlation) are expected by convolving the waveform excitation and (computed estimate of) the kernel impulse response obtained from real measurement data from a prior ping (or probe pulse). The convolved response is then match filtered with the received waveform of a subsequent ping. Convolution of the waveform excitation with the properly estimated kernel response achieves multipath recombination, thus yielding a signal that is highly resolved in range and Doppler.

From a given ping cycle, essential environmental information can be collected from the measurement data. Specifically, essential parameters such as sound propagation speed and boundary conditions (i.e., surface and bottom effects) are inherently contained within the measured input excitation and received waveform responses from an active source. As a result, each subsequent ping cycle can adaptively exploit environmental information from previous cycles in order to attain adaptive DCL improvement.

The DCL apparatus and procedure is applicable to any situation in which high resolution (i.e., large time-bandwidth product) waveforms are utilized in an active sonar setting.

In addition, by considering $E_{min}$ for successively higher-order fits, the proper order of the fit can be ascertained. The model order consistent with the best fit (i.e., that which provides the smallest error in the least squares sense) yields the proper order of the fit. This fit can be used by a sonar system or operator for determining the frequency response(s) of the various kernels for the particular ocean environment or channel. Signal deformities can then be removed, and subsequent signal processing can be optimized.

The proposed method has an advantage over conventional methods in that the kernels are determined empirically from the Volterra-Hermite model using measured values of the excitation and receiver input. Furthermore, the method enables the fit to be adjusted for Doppler effects using the contracted cross ambiguity function. The Eigen filters assure statistical independence and the method enables one to assess individually the energy contributions arising from the linear versus the higher-order nonlinear components. From related inventions, it is known that the least squares method also provides a much higher model accuracy than standard correlation methods since "least squares" can make much better use of the available degrees of freedom. By determining the channel/target response, namely the kernels, one can also determine the probability density distributions with which to compute the optimum Likelihood Ratio (LR) for a prescribed signal processor.

The excitation waveform preferably is a signal that is a wide band, long duration pulse. In FIG. 2, the input signal x(n) is a measured bandpass input derived by applying a Bandpass filter 120 to a white Gaussian input w(n).

The method for improved active sonar using SVD filtering and a Volterra-Hermite basis expansion procedure is applicable to any situation which utilizes the transmission, propagation, and reception of active underwater acoustic signals. It is particularly useful in marine environments in which nonlinearity may be a dominant factor, such as arising from irregular bottom and surface interactions, nonlinear resonant scattering within the propagation channel or any other non-homogeneous responses due to channel and/or target interactions.

The system for improved active sonar comprises an acoustic signal transmitter for producing a transmitted acoustic signal; an acoustic receiver, a received acoustic signal produced responsively to said transmitted acoustic signal; and a processor joined to said acoustic signal transmitter and said acoustic receiver to utilize Eigen filters and a Volterra-Hermite Series Expansion comprising a plurality of Volterra-kernel orders to compute a modeled response that simulates a measured channel response. The processor is capable of comparing said channel and the Volterra-Hermite Series Expansion to determine a fitting error, and correcting for Doppler effects. Furthermore, the processor is capable of computing the channel's linear and non-linear orders comprising the Volterra kernels. This capability enables the process to determine at which order said fitting error is minimized and how many Eigen filters are necessary to account for most of the received energy. The final fitting error is the minimized total squared error. The transmitted signal preferably is a long pulse of Gaussian white noise with an operational band of 5 kHz to 10 kHz. However, the procedure is not limited to these bands. Other operational bands of comparable extent are permissible. This provides wide band, long duration pulses (i.e., large time bandwidth product) to achieve high-resolution waveform ranging and Doppler accuracy by recombination of the energy spreading losses.

It will be appreciated by those skilled in the art that the invention could be implemented for testing and/or operation using a suitable programmed general purpose computer or special purpose hardware, with program routines or logical circuit sets performing as processors. Such routines or logical circuit sets may also be referred to as processors or the like.

Therefore, it will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:
1. A method for improved active sonar, said method comprising:
providing an excitation waveform x(t);
providing a measured channel response z(t);
filtering the excitation waveform x(t) using a plurality of Eigen filters generated by a Singular Value Decomposition (SVD) of the covariance matrix of the excitation waveform, where the SVD produces all the eigenvectors with their eigenvalues;

constructing a nonlinear basis set to determine the kernel estimates of a Volterra-Hermite series expansion of the eigenvectors, where the basis set is a nonlinear no-memory device and the order of the nonlinearity selected determines the number and combinations of filters that are required to compute the essential kernels for performing an accurate estimate of a modeled response, y(t);

determining the coefficients for the modeled response, y(t) against the actual data measurements of measured channel response z(t) and minimizing the sum of squared errors, where the fitting model minimizes the sum of the squared errors between actual measurement and the modeled response y(t);

utilizing the modeled response and coefficients to obtain an accurate channel estimate;

receiving actual active sonar return signals; and utilizing the channel estimate to remove channel effects from actual sonar signals to improve at least one of detection, classification and localization provided to an operator.

2. The method of claim 1, wherein the excitation waveform is an output signal that is a wide band, long duration pulse, or a return signal, or a paired output and return signal, or a signal from another source.

3. The method of claim 1, wherein the order of the nonlinearity selected determines the number and combinations of filters that are required to construct the essential kernels for performing an accurate estimate of the measured channel response.

4. The method of claim 1, wherein the modeled Volterra-Hermite Series signal is a Volterra series with a Hermite basis expansion of all cross-product terms of the series utilizing a Wiener's G-functional modification.

5. The method of claim 4, wherein the Wiener modification maintains a complete lack of correlation between kernel components of any specified order at the same time instant, and the individual energy contributions at each order are known, where the kernel order containing the largest energy contribution provides an indication of whether the dominant attribute in the measured channel response is a selected one of linear and nonlinear.

6. The method of claim 5, wherein if most of the energy is associated with the first-order kernel, then the measured channel response is dominated by linearity, and if most of the energy is found to reside with the higher-order kernels, then the energy in the measured channel response has evolved principally by nonlinear interactions.

7. A method for detecting sonar signals, said method comprising:

providing an excitation waveform x(t);

providing measured channel response z(t);

providing measured Doppler and range values;

generating a modeled output response of the excitation waveform by minimizing the sum of squared error between the measured output channel response and the modeled output response, where said output modeled response is generated by:

filtering the excitation waveform using a plurality of Eigen filters to generate a Singular Value Decomposition (SVD) of the covariance matrix of the excitation waveform, where each component of the SVD has an eigenvector with a corresponding eigenvalue;

constructing a nonlinear basis set to determine the kernel estimates of a Volterra-Hermite series expansion of the eigenvectors, where the basis set is a nonlinear no-memory device and the order of the nonlinearity selected determines the number and combinations of filters that are required for computing the essential kernels for performing an accurate estimate of the modeled response y(t);

determining the coefficients for a modeled Volterra-Hermite series signal against the actual data measurements of said measured channel response z(t) and minimizing the sum of squared errors, where the fitting model minimizes the sum of the squared errors between actual measurement and the modeled response y(t);

adjusting the excitation waveform with an appropriate contracted sampling sequence to exactly match the Doppler value, and recalculating the modeled response;

utilizing the modeled response and coefficients to obtain an accurate channel estimate;

receiving actual active sonar return signals; and utilizing the channel estimate to remove channel effects from actual sonar signals to improve at least one of detection, classification and localization provided to an operator.

8. The method of claim 7, wherein said Doppler value is determined from a contracted cross-ambiguity calculation.

9. The method of claim 8, wherein a broadband contracted cross-ambiguity function can be employed to cross correlate the excitation waveform with the modeled response over a wide range of Doppler values, where a peak value or values provides an indication of the true Doppler at a corresponding peak time delay.

10. The method of claim 8, wherein Doppler effects reflect a distribution of energy due to multipath spreading, and the modeled response recombines the spread of energy.

11. The method of claim 7, wherein the order of the nonlinearity selected determines the number and combinations of filters that are required to construct the essential kernels for performing an accurate estimate of the measured channel response.

12. The method of claim 7, wherein the modeled Volterra-Hermite Series signal is a Volterra series with a Hermite basis expansion of all cross-product terms of the series utilizing a Wiener's G-functional modification.

13. The method of claim 12, wherein the Wiener modification maintains a complete lack of correlation between kernel components of any specified order at the same time instant, and the individual energy contributions at each order are known, where the kernel order containing the largest energy contribution provides an indication of whether the dominant attribute in the measured channel response is linear or nonlinear.

14. The method of claim 12, wherein if most of the measured channel response energy is associated with the first-order kernel, then the measured channel response energy is dominated by linearity, and if most of the measured channel response energy is found to reside with the higher-order kernels, then the energy in the measured channel response has evolved principally by nonlinear interactions.

15. A system for improved active sonar, said system comprising:

an acoustic signal transmitter capable of producing a transmitted acoustic signal;

an acoustic receiver capable of receiving a received acoustic waveform produced responsively to said transmitted acoustic signal; and a processor joined to said acoustic signal transmitter and said acoustic receiver to utilize Eigen filters and a Volterra-Hermite Series Expansion comprising a plurality of Volterra kernel orders to compute a modeled response that simulates a measured channel response, said modeled response being provided to the active sonar system.

16. The system of claim 15, wherein said processor is capable of comparing said received acoustic waveform and the Volterra-Hermite Series Expansion to determine a fitting error and to correct for Doppler effects.

17. The system of claim 16, wherein said processor is capable of computing said received acoustic waveform using linear and non-linear orders utilizing a Volterra-Hermite Series Expansion.

18. The system of claim 17, wherein said processor is capable of determining at which orders said fitting error is minimized and how many Eigen filters are necessary to account for most of the energy.

19. The system of claim 18, wherein said fitting error is a minimized total squared error.

20. The system of claim 15, wherein said transmitted signal is a Guassian white noise pulse with an operational band of 5 kHz to 10 kHz.

* * * * *